(12) United States Patent
Guo et al.

(10) Patent No.: US 12,316,452 B2
(45) Date of Patent: May 27, 2025

(54) RESERVATION PERIODICITY FOR NR V2X PERIODIC SCHEDULING

(71) Applicant: QUALCOMM Incorporated, San Diego, CA (US)

(72) Inventors: Hui Guo, Beijing (CN); Tien Viet Nguyen, Bridgewater, NJ (US); Kapil Gulati, Belle Mead, NJ (US); Sudhir Kumar Baghel, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/759,171

(22) PCT Filed: Feb. 14, 2020

(86) PCT No.: PCT/CN2020/075188
§ 371 (c)(1),
(2) Date: Jul. 20, 2022

(87) PCT Pub. No.: WO2021/159435
PCT Pub. Date: Aug. 19, 2021

(65) Prior Publication Data
US 2023/0046308 A1 Feb. 16, 2023

(51) Int. Cl.
*H04L 1/08* (2006.01)
*H04L 1/1812* (2023.01)
*H04W 92/18* (2009.01)

(52) U.S. Cl.
CPC .............. *H04L 1/08* (2013.01); *H04L 1/1812* (2013.01); *H04W 92/18* (2013.01)

(58) Field of Classification Search
None
See application file for complete search history.

(56) References Cited

U.S. PATENT DOCUMENTS

2006/0193276 A1* 8/2006 Sakata ................ H04L 43/0852
370/310
2020/0029318 A1* 1/2020 Guo ...................... H04W 76/14
(Continued)

FOREIGN PATENT DOCUMENTS

CN 110545534 A 12/2019
WO WO-2019211674 A1 11/2019
WO WO-2020033089 A1 2/2020

OTHER PUBLICATIONS

Asustek, "Discussion on Sidelink Physical Layer Procedure on NR V2X", 3GPP Draft, 3GPP TSG Ran WG1 #96bis, R1-1904680, Xi'an, China, Apr. 8-12, 2019, Apr. 12, 2019 (Apr. 12, 2019), 4 Pages, the whole document.
(Continued)

*Primary Examiner* — Lonnie V Sweet
(74) *Attorney, Agent, or Firm* — Harrity & Harrity, LLP

(57) ABSTRACT

Various aspects of the present disclosure generally relate to wireless communication. In some aspects, a user equipment (UE) may reserve a transmission resource for transmitting a transmission block (TB) via a sidelink communication; reserve a retransmission resource for retransmitting the TB, wherein the retransmission resource is reserved such that at least one hybrid automatic repeat request acknowledgement (HARQ-ACK) feedback occasion occurs between transmission of the TB and a first retransmission of the TB; and communicate with another UE via the sidelink communication based at least in part on the transmission and retransmission resources. Numerous other aspects are provided.

17 Claims, 6 Drawing Sheets

(56) References Cited

U.S. PATENT DOCUMENTS

| | | | |
|---|---|---|---|
| 2020/0037343 A1 | 1/2020 | He et al. | |
| 2021/0127364 A1* | 4/2021 | Panteleev | H04L 1/1819 |
| 2022/0046564 A1* | 2/2022 | Shimoda | H04W 56/0065 |
| 2022/0182206 A1* | 6/2022 | Zhao | H04L 5/0055 |
| 2022/0209905 A1* | 6/2022 | Han | H04L 1/1887 |
| 2022/0394560 A1* | 12/2022 | Yu | H04W 72/0446 |

OTHER PUBLICATIONS

International Search Report and Written Opinion—PCT/CN2020/075188—ISAEPO—Nov. 18, 2020, 9 pages.

Intel Corporation: "Design of Resource Allocation Mode-2 for NR V2X Sidelink Communication", 3GPP TSG WG1 Meeting #99, R1-1912205, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823282, pp. 1-32.

Supplementary European Search Report—EP20918863—Search Authority—The Hague—Oct. 16, 2023, 8 Pages.

Zte, et al., "Mode 2 Resource Allocation Schemes on Sidelink", 3GPP TSG RAN WG1 #99, R1-1912553, 3rd Generation Partnership Project, Mobile Competence Centre, 650, Route Des Lucioles, F-06921 Sophia-Antipolis Cedex, France, vol. RAN WG1, No. Reno, Nevada, US, Nov. 18, 2019-Nov. 22, 2019, Nov. 9, 2019, XP051823488, 12 Pages, pp. 2-3, 2 Mode 2 Resource Scheme Procedure, pp. 7-8, 5 Whether to Use Released Resource(s) of Feedback-Based Retransmissions of the Transmitting UE.

* cited by examiner

RESERVATION PERIODICITY FOR NR V2X PERIODIC SCHEDULING

CROSS-REFERENCE TO RELATED APPLICATION

This Patent Application is a 371 national stage of PCT Application No. PCT/CN2020/075188 filed on Feb. 14, 2020, entitled "RESERVATION PERIODICITY FOR NR V2X PERIODIC SCHEDULING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reservation periodicity for new radio (NR) vehicle-to-everything (V2X) periodic scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include reserving a transmission resource for transmitting a transmission block (TB) via a sidelink communication; reserving a retransmission resource for retransmitting the TB, wherein the retransmission resource is reserved such that at least one hybrid automatic repeat request acknowledgement (HARQ-ACK) feedback occasion occurs between transmission of the TB and a first retransmission of the TB; and communicating with another UE via the sidelink communication based at least in part on the transmission and retransmission resources.

In some aspects, a UE for wireless communication may include memory and one or more processors operatively coupled to the memory. The memory and the one or more processors may be configured to reserve a transmission resource for transmitting a TB via a sidelink communication; communicate with another UE via the sidelink communication based at least in part on the transmission and retransmission resources.

In some aspects, a non-transitory computer-readable medium may store one or more instructions for wireless communication. The one or more instructions, when executed by one or more processors of a UE, may cause the one or more processors to: reserve a transmission resource for transmitting a TB via a sidelink communication; communicate with another UE via the sidelink communication based at least in part on the transmission and retransmission resources.

In some aspects, an apparatus for wireless communication may include means for reserving a transmission resource for transmitting a TB via a sidelink communication; means for reserving a retransmission resource for retransmitting the TB, wherein the retransmission resource is reserved such that at least one hybrid automatic repeat request acknowledgement (HARQ-ACK) feedback occasion occurs between transmission of the TB and a first retransmission of the TB; and means for communicating with another apparatus via the sidelink communication based at least in part on the transmission and retransmission resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
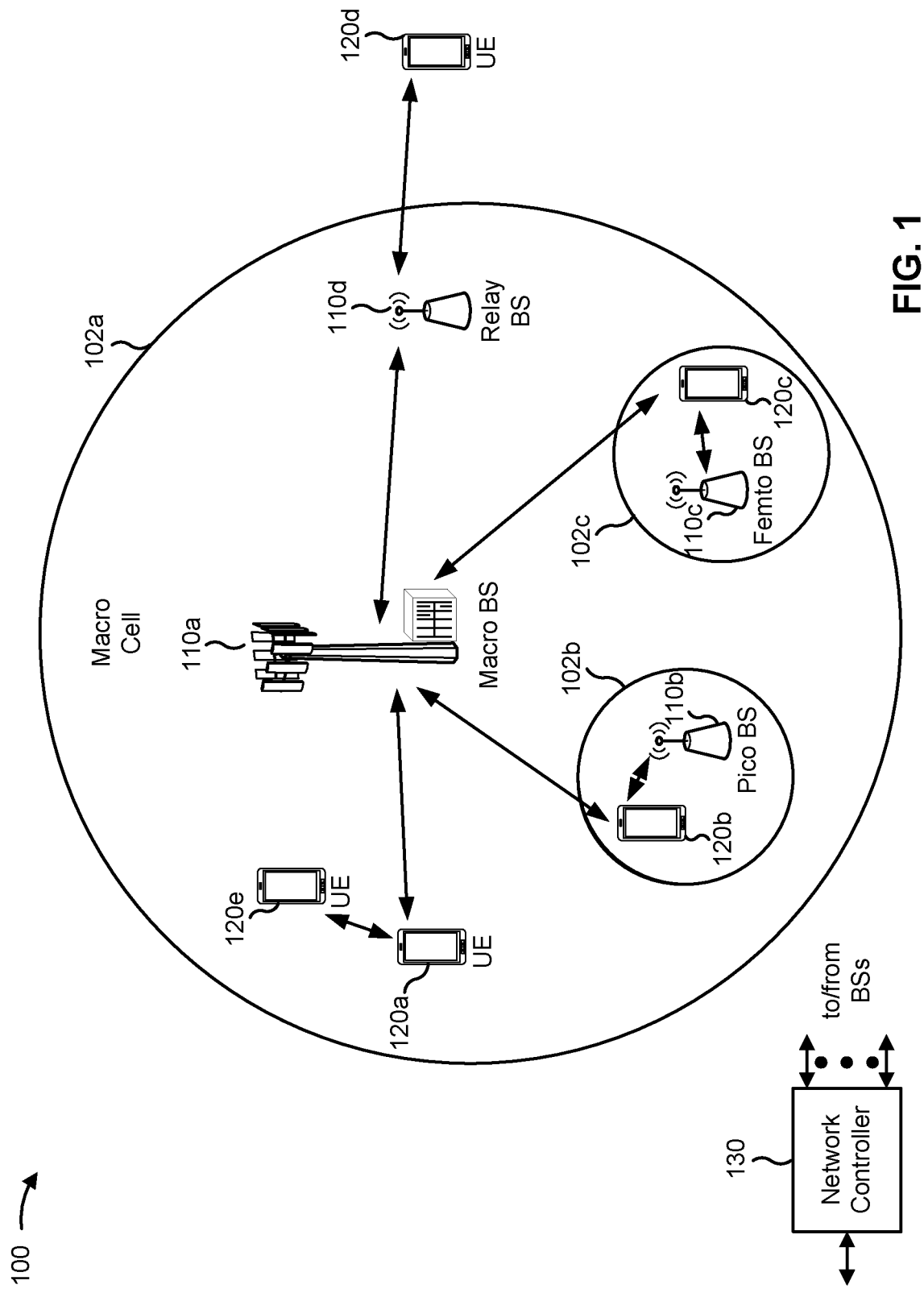
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
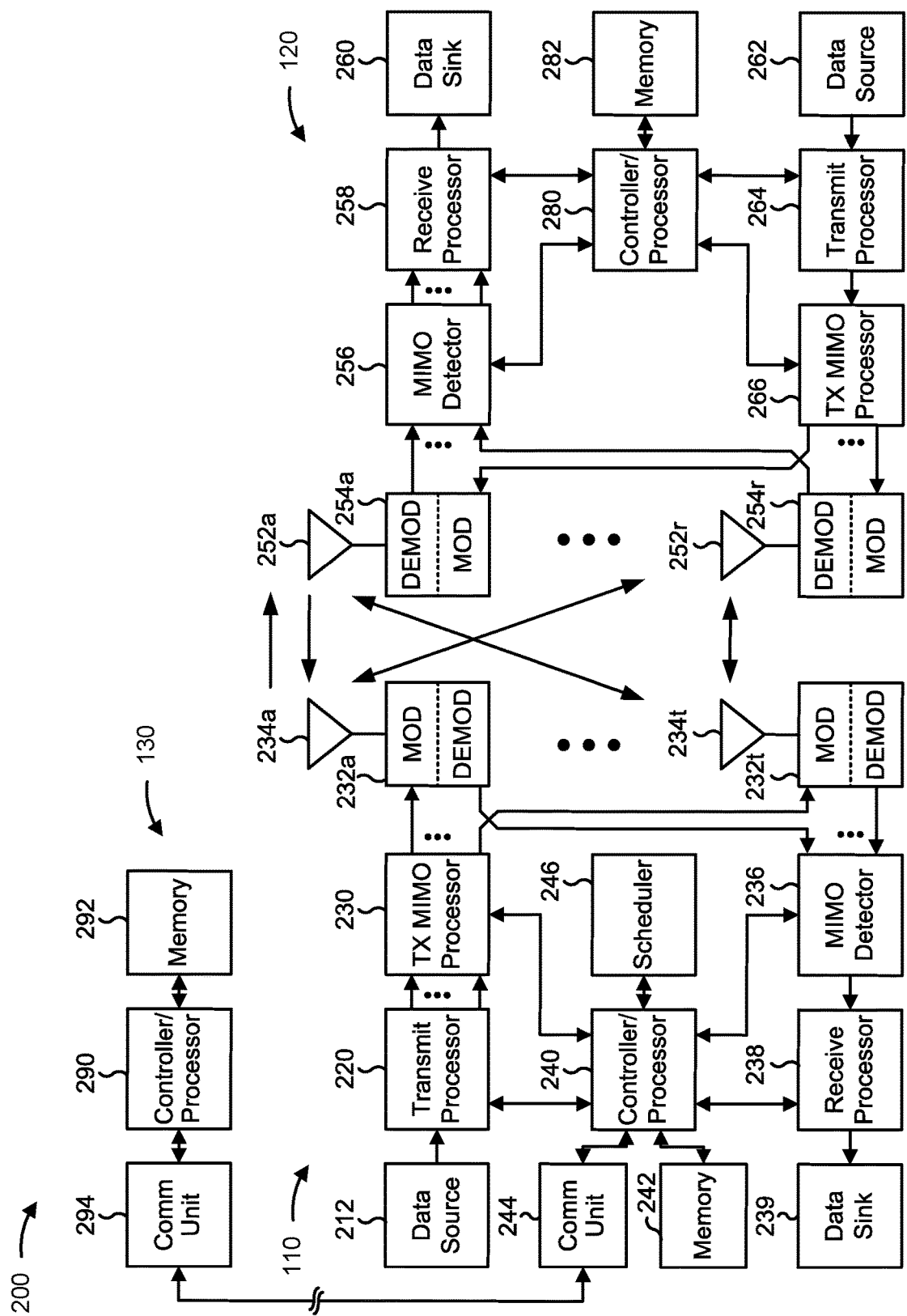
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reservation periodicity for NR V2X periodic scheduling, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 600 of FIG. 6, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for reserving a transmission resource for transmitting a transmission block (TB) via a sidelink communication, means for reserving a retransmission resource for retransmitting the TB, wherein the retransmission resource is reserved such that at least one hybrid automatic repeat request acknowledgement (HARQ-ACK) feedback occasion occurs between transmission of the TB and a first retransmission of the TB, means for communicating with another UE via the sidelink communication based at least in part on the transmission and retransmission resources, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
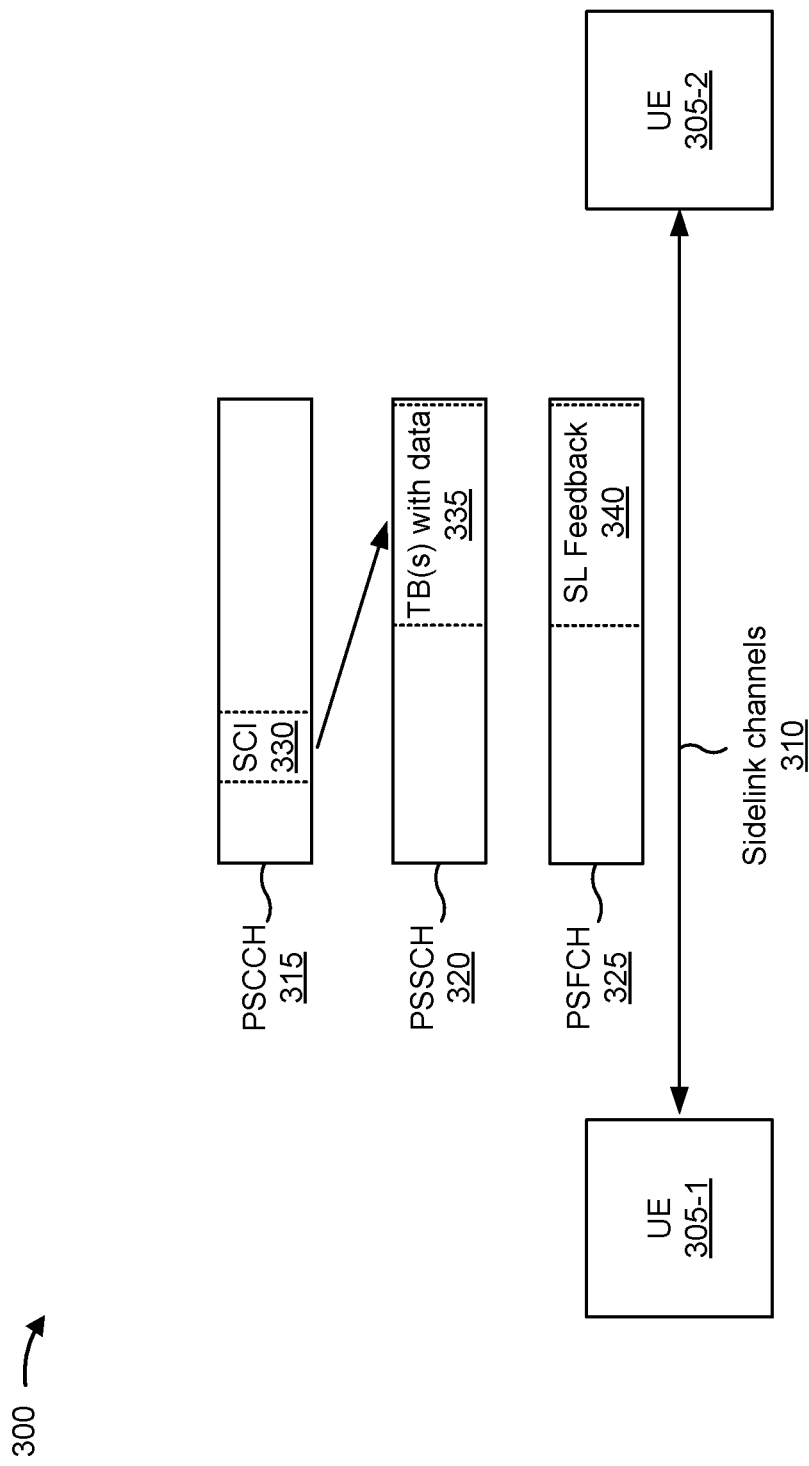
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
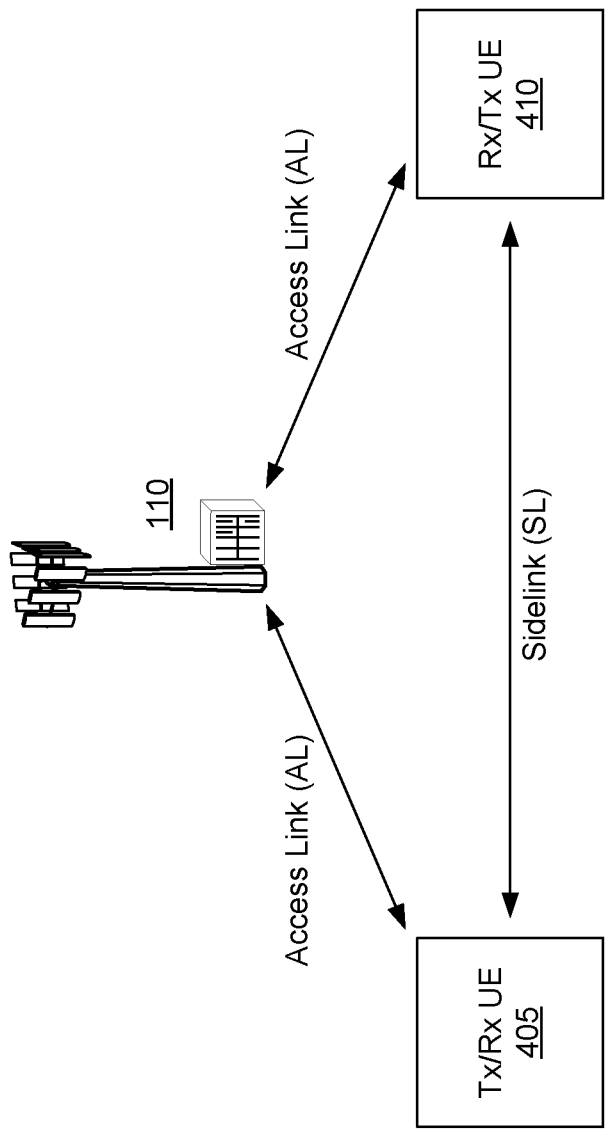
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a sidelink may refer to a direct link between UEs 120, and an access link may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
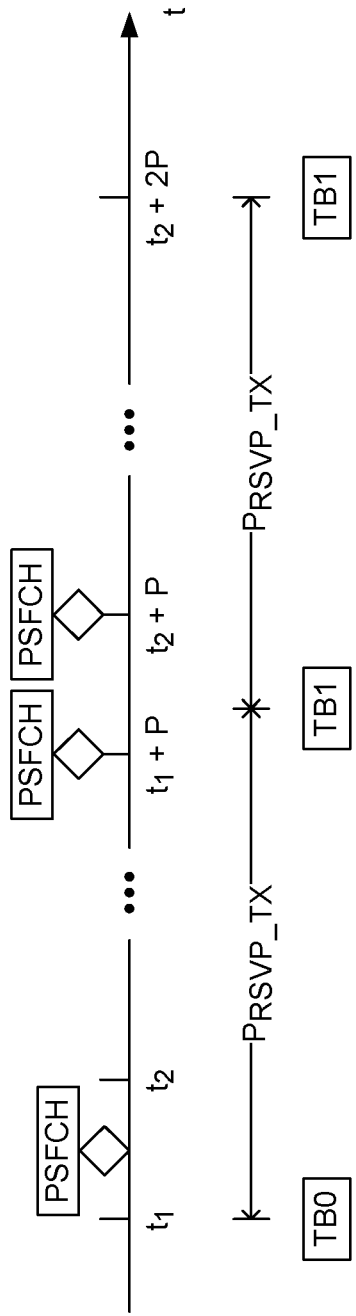
FIG. 5 is a diagram illustrating an example of periodic resource scheduling for sidelink communications, in accordance with various aspects of the present disclosure.

FIG. 5 is a diagram illustrating an example 500 of periodic resource scheduling for sidelink communications, in accordance with various aspects of the present disclosure.

Both aperiodic and periodic transmissions are supported for NR V2X. With periodic transmission, resources for new transmission block (TB) transmissions and retransmissions can be pre-reserved. With sidelink transmission, as explained above, HARQ feedback (e.g. HARQ-ACK and/or HARQ-NACK) may be transmitted via a PSFCH transmission from a receiving UE or UEs to a transmitting UE. Under certain resource reservation interval value and numerology, there is a possibility that no HARQ feedback is expected within two consecutive re-transmissions of a TB transmission, as no PSFCH occasion is met.

In NR V2X periodic scheduling, resources may be reserved for transmitting new TBs (shown in FIG. 5 as "$t_1$, $t_1+P, \ldots$"). The periodicity of the resource scheduling may be based at least in part on a resource reservation interval (labeled as "P" herein). The resource reservation interval is a higher layer parameter, specified as reservationPeriodAllowed, and may have the range, in milliseconds, of 0, [1, . . . , 99], 100, 200, . . . , 900, 1000. Thus, for example, when $t_{slot}<1$ ms (e.g., $\mu>=1$, 30/60/120 kHz SCS), P is in the slot. The resource reservation interval also may apply for reserving periodic retransmission resources (shown as $t_i+n*P$, which is the $i^{th}$ transmission of TBn, where i=1, 2, . . . , $N_{max\_retx\_times}$ and n=0, 1, 2, . . . ).

In operation, sidelink HARQ-ACK feedback may be transmitted from a receiving UE to a transmitting UE via a PSFCH transmission, indicating corresponding PSSCH detection results, to trigger possible re-transmission of the TB. Additionally, within the slots associated with the resource pool, PSFCH resources are pre-configured periodically with a period of N slot(s), N=0/1/2/4, which is a parameter specified as a periodPSFCHresource.

As shown in FIG. 5, when P (in ms) is odd, and feedback only appears once every four slots (N=4), it is possible that there is no feedback occasion between [$t_1+P$, $t_2+P$], [$t_1+3P$, $t_2+3P$], and/or the like. This issue may be compounded by a feedback offset that indicates a time period between a PSFCH occasion and an associated PSSCH transmission, specified as MinTimeGapPSFCH, which is defined as 2 slots or 3 slots.

In some aspects, techniques and apparatuses are provided for reservation periodicity design and feedback occasion assurance to ensure that a feedback occasion occurs between consecutive transmissions and/or retransmissions of a TB. In some aspects, a UE may reserve a retransmission resource such that at least one HARQ-ACK feedback occasion occurs between TB transmissions, ensuring that each transmission may be followed by feedback, which may facilitate improving the efficiency and reliability of TB transmissions in NR V2X. In some aspects, a UE may evaluate a resource reservation to determine whether a feedback occasion will occur between a most recent transmission and a next transmission or a retransmission. If the evaluation reveals that no feedback occasion will occur between the transmissions or the transmission and the retransmission, the UE may reselect a retransmission resource, thereby updating a resource reservation. In this way, the UE may ensure that a feedback occasion will occur between the transmissions.

In some aspects, the UE may evaluate after each new TB transmission, after each TB retransmission, and/or the like, thereby enabling the UE to maintain assurance of feedback occasions. In some aspects, the UE may update a duration between a TB transmission and a retransmission of the TB at time t1+P, and this update also may be applied to t1+P, t1+3P, t1+5P . . . , and/or, with no extra attention or efforts made, to t1, t1+2P, t1+4P, . . . and/or the like. In some aspects, a retransmission reservation may be updated at each retransmission resource selection, which may be more flexible, but more complex, than updating at each TB transmission.

As indicated above, FIG. 5 is provided as an example. Other examples may differ from what is described with respect to FIG. 5.

Figure 6:
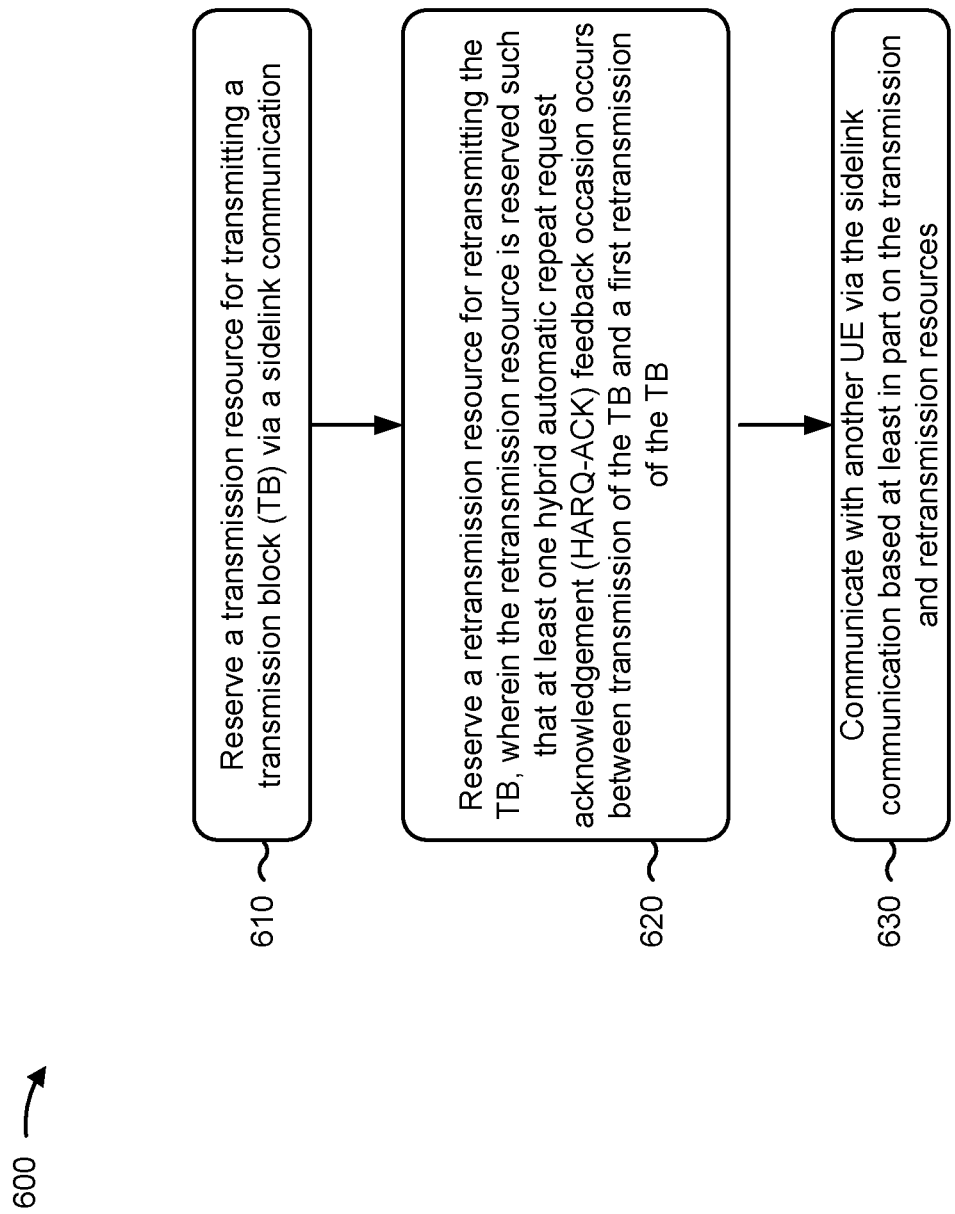
FIG. 6 is a diagram illustrating an example process performed, for example, by a user equipment, in accordance with various aspects of the present disclosure.

FIG. 6 is a diagram illustrating an example process 600 performed, for example, by a user equipment (UE), in accordance with various aspects of the present disclosure. Example process 600 is an example where the UE (e.g., UE 120 and/or the like) performs operations associated with reservation periodicity for NR V2X periodic scheduling.

As shown in FIG. 6, in some aspects, process 600 may include reserving a transmission resource for transmitting a transmission block (TB) via a sidelink communication (block 610). For example, the UE (e.g., using transmit processor 264, controller/processor 280, memory 282, and/or the like) may reserve a transmission resource for transmitting a transmission block (TB) via a sidelink communication (block 610), as described above.

As further shown in FIG. 6, in some aspects, process 600 may include reserving a retransmission resource for retransmitting the TB, wherein the retransmission resource is reserved such that at least one hybrid automatic repeat request acknowledgement (HARQ-ACK) feedback occasion occurs between transmission of the TB and a first retransmission of the TB (block 620). For example, the UE (e.g., using transmit processor 264, controller/processor 280, memory 282, and/or the like) may reserve a retransmission resource for retransmitting the TB, as described above. In some aspects, the retransmission resource is reserved such that at least one hybrid automatic repeat request acknowledgement (HARQ-ACK) feedback occasion occurs between transmission of the TB and a first retransmission of the TB.

As further shown in FIG. 6, in some aspects, process 600 may include communicating with another UE via the sidelink communication based at least in part on the transmission and retransmission resources (block 630). For example, the UE (e.g., using receive processor 258, transmit processor 264, controller/processor 280, memory 282, and/or the like) may communicate with another UE via the sidelink communication based at least in part on the transmission and retransmission resources, as described above.

Process 600 may include additional aspects, such as any single aspect or any combination of aspects described below and/or in connection with one or more other processes described elsewhere herein.

In a first aspect, the retransmission resource is reserved such that at least one HARQ-ACK feedback occasion occurs between any two consecutive retransmissions of the TB.

In a second aspect, alone or in combination with the first aspect, the retransmission resource is reserved based at least in part on one or more parameters, the one or more parameters comprising: a resource reservation interval, a feedback offset that indicates a time period between a physical sidelink feedback channel (PSFCH) occasion and an associated physical sidelink shared channel (PSSCH) transmission, or a combination thereof. In some aspects, the UE may ensure that there is at least one PSFCH within an interval $[t_1+k+2*i*P, t_2+2*i*P]$, where i=0, 1, 2, . . . ; K is the feedback offset discussed above, and k is the smallest integer larger than or equal to K with the condition that slot $t_n+k$ contains PSFCH resources. In some aspects, the UE may select a resource periodicity at $t_1+k$.

In a third aspect, alone or in combination with one or more of the first and second aspects, the retransmission resource is reserved based at least in part on a periodicity value, wherein the periodicity value comprises a smallest integer larger than or equal to the feedback offset such that a slot indicated by the periodicity value contains a PSFCH occasion.

In a fourth aspect, alone or in combination with one or more of the first through third aspects, wherein the retransmission resource is reserved based at least in part on a sum of the periodicity value and the resource reservation interval. In some aspects, the UE may ensure that there is at least one PSFCH within an interval $[t_1+k+(2*i+1)*P, t_2+(2*i+1)P]$. In some aspects, the UE may select a resource periodicity at $t_1+k+P$.

In a fifth aspect, alone or in combination with one or more of the first through fourth aspects, process 600 includes determining that an initial retransmission resource, corresponding to an initial resource reservation for the first retransmission of the TB, was selected such that at least one HARQ-ACK feedback occasion does not occur between the transmission of the TB and the first retransmission of the TB; and reserving the retransmission resource in response to determining that the initial retransmission resource was selected such that at least one HARQ-ACK feedback occasion does not occur between the transmission of the TB and the first retransmission of the TB.

In a sixth aspect, alone or in combination with one or more of the first through fifth aspects, the retransmission resource corresponds to the first retransmission of the TB.

In an eighth aspect, alone or in combination with one or more of the first through seventh aspects, process 600 includes evaluating the retransmission resource after the transmission of the TB and after each transmission of one or more additional TBs.

In a ninth aspect, alone or in combination with one or more of the first through eighth aspects, process 600 includes reserving an updated retransmission resource based on evaluating the retransmission resource.

In a tenth aspect, alone or in combination with one or more of the first through ninth aspects, process 600 includes evaluating the retransmission resource after the retransmission of the TB and after each retransmission of one or more additional retransmissions of the TB.

In an eleventh aspect, alone or in combination with one or more of the first through tenth aspects, process 600 includes reserving an updated retransmission resource based on evaluating the retransmission resource.

In a twelfth aspect, alone or in combination with one or more of the first through eleventh aspects, process 600 includes transmitting, to the other UE, an indication of the updated retransmission resource.

In a thirteenth aspect, alone or in combination with one or more of the first through twelfth aspects, the indication of the updated retransmission resource comprises a bit in sidelink control information (SCI) carried in a physical sidelink control channel (PSCCH) transmission.

In a fourteenth aspect, alone or in combination with one or more of the first through thirteenth aspects, the retransmission resource is reserved based at least in part on a resource reservation interval, wherein a value of the resource reservation interval is an even number and is selected from an allowed set of values, wherein each value of the allowed set of values is an even number.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    reserving a transmission resource for transmitting a transmission block (TB) via a sidelink communication;
    reserving a retransmission resource for retransmitting the TB, wherein the retransmission resource is reserved based at least in part on evaluating the retransmission resource to configure that at least one hybrid automatic repeat request acknowledgement (HARQ-ACK) feedback occasion occurs between transmission of the TB and a first retransmission of the TB; and
    communicating with another UE via the sidelink communication based at least in part on the transmission and retransmission resources.

2. The method of claim 1, wherein the retransmission resource is reserved such that at least one HARQ-ACK feedback occasion occurs between any two consecutive retransmissions of the TB.

3. The method of claim 1, wherein the retransmission resource is reserved based at least in part on one or more parameters, the one or more parameters comprising:
    a resource reservation interval,
    a feedback offset that indicates a time period between a physical sidelink feedback channel (PSFCH) occasion and an associated physical sidelink shared channel (PSSCH) transmission, or
    a combination thereof.

4. The method of claim 3, wherein the retransmission resource is reserved based at least in part on a periodicity value, wherein the periodicity value comprises a smallest integer larger than or equal to the feedback offset such that a slot indicated by the periodicity value contains a PSFCH occasion.

5. The method of claim 4, wherein the retransmission resource is reserved based at least in part on a sum of the periodicity value and the resource reservation interval.

6. The method of claim 1, further comprising:
    determining that an initial retransmission resource, corresponding to an initial resource reservation for the first retransmission of the TB, was selected such that at least one HARQ-ACK feedback occasion does not occur between the transmission of the TB and the first retransmission of the TB; and
    reserving the retransmission resource in response to determining that the initial retransmission resource was selected such that at least one HARQ-ACK feedback occasion does not occur between the transmission of the TB and the first retransmission of the TB.

7. The method of claim 1, wherein the retransmission resource corresponds to the first retransmission of the TB.

8. The method of claim 1, wherein evaluating the retransmission resources further comprises evaluating the retransmission resource after the transmission of the TB and after each transmission of one or more additional TBs.

9. The method of claim 8, further comprising reserving an updated retransmission resource based on evaluating the retransmission resource.

10. The method of claim 1, wherein evaluating the retransmission resource further comprises evaluating the retransmission resource after the retransmission of the TB and after each retransmission of one or more additional retransmissions of the TB.

11. The method of claim 10, further comprising reserving an updated retransmission resource based on evaluating the retransmission resource.

12. The method of claim 11, further comprising transmitting, to the other UE, an indication of the updated retransmission resource.

13. The method of claim 12, wherein the indication of the updated retransmission resource comprises a bit in sidelink control information (SCI) carried in a physical sidelink control channel (PSCCH) transmission.

14. The method of claim 1, wherein the retransmission resource is reserved based at least in part on a resource reservation interval, wherein a value of the resource reservation interval is an even number and is selected from an allowed set of values, wherein each value of the allowed set of values is an even number.

15. A user equipment (UE) for wireless communication, comprising:
  a memory; and
  one or more processors operatively coupled to the memory, the memory and the one or more processors configured to:
    reserve a transmission resource for transmitting a transmission block (TB) via a sidelink communication;
    reserve a retransmission resource for retransmitting the TB, wherein the retransmission resource is reserved based at least in part on an evaluation of the retransmission resource to configure that at least one hybrid automatic repeat request acknowledgement (HARQ-ACK) feedback occasion occurs between transmission of the TB and a first retransmission of the TB; and
    communicate with another UE via the sidelink communication based at least in part on the transmission and retransmission resources.

16. A non-transitory computer-readable medium storing one or more instructions for wireless communication, the one or more instructions comprising:
  one or more instructions that, when executed by one or more processors of a user equipment (UE), cause the one or more processors to:
    reserve a transmission resource for transmitting a transmission block (TB) via a sidelink communication;
    reserve a retransmission resource for retransmitting the TB, wherein the retransmission resource is reserved based at least in part on an evaluation of the retransmission resource to configure that at least one hybrid automatic repeat request acknowledgement (HARQ-ACK) feedback occasion occurs between transmission of the TB and a first retransmission of the TB; and
    communicate with another UE via the sidelink communication based at least in part on the transmission and retransmission resources.

17. An apparatus for wireless communication, comprising:
  means for reserving a transmission resource for transmitting a transmission block (TB) via a sidelink communication;
  means for reserving a retransmission resource for retransmitting the TB, wherein the retransmission resource is reserved based at least in part on evaluating the retransmission resource to configure that at least one hybrid automatic repeat request acknowledgement (HARQ-ACK) feedback occasion occurs between transmission of the TB and a first retransmission of the TB; and
  means for communicating with another apparatus via the sidelink communication based at least in part on the transmission and retransmission resources.

* * * * *